W. UPTHEGROVE.
WAGON RACK.
APPLICATION FILED OCT. 25, 1916.
1,251,597.
Patented Jan. 1, 1918
2 SHEETS—SHEET 1.
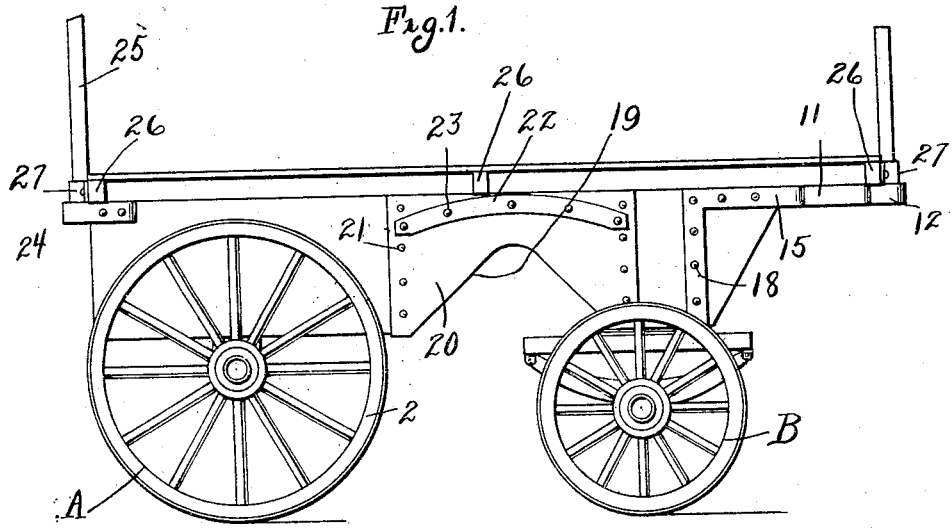
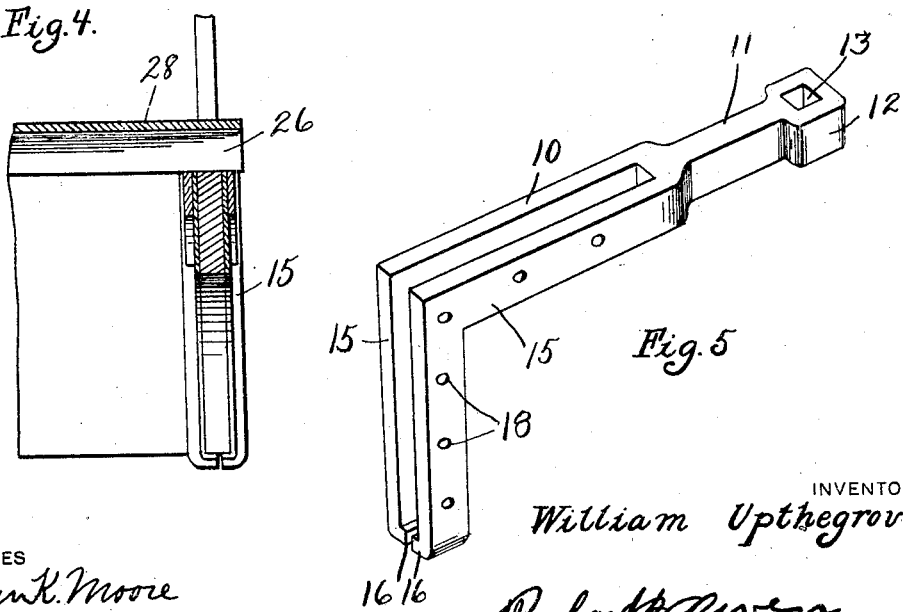
INVENTOR
William Upthegrove
WITNESSES
ATTORNEY

W. UPTHEGROVE.
WAGON RACK.
APPLICATION FILED OCT. 25, 1916.

1,251,597.

Patented Jan. 1, 1918.
2 SHEETS—SHEET 2.

WITNESSES
Arthur K. Moore
Wm. H. Mulligan

INVENTOR
William Upthegrove
BY Richard Bowen
ATTORNEY

UNITED STATES PATENT OFFICE.

WILLIAM UPTHEGROVE, OF VERNON TOWNSHIP, ISABELLA COUNTY, MICHIGAN.

WAGON-RACK.

1,251,597.    Specification of Letters Patent.    Patented Jan. 1, 1918.

Application filed October 25, 1916.  Serial No. 127,722.

*To all whom it may concern:*

Be it known that I, WILLIAM UPTHEGROVE, a citizen of the United States, residing at Vernon township, in the county of Isabella and State of Michigan, have invented certain new and useful Improvements in Wagon-Racks, of which the following is a specification.

This invention relates to a wagon rack and the primary object is to provide a rack mounted upon a wagon body whereby the rack may be transported and be disposed at a height for allowing the workman to conveniently load and unload the rack.

Another object of the invention is to provide a rack adapted to be detachably supported upon wagon trucks and be constructed so that a relatively large quantity of hay, grain or the like may be transported from place to place, the rack being constructed so that the wheels of the forward truck may turn sharply for permitting the rack to be turned when in close quarters.

A further object of this invention is the provision of a wagon rack which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a side elevation of the rack showing the same mounted upon two wagon trucks.

Fig. 4 is a fragmentary vertical transverse section.

Fig. 5 is a detail perspective view of one of the forward brace members.

Figure 2:
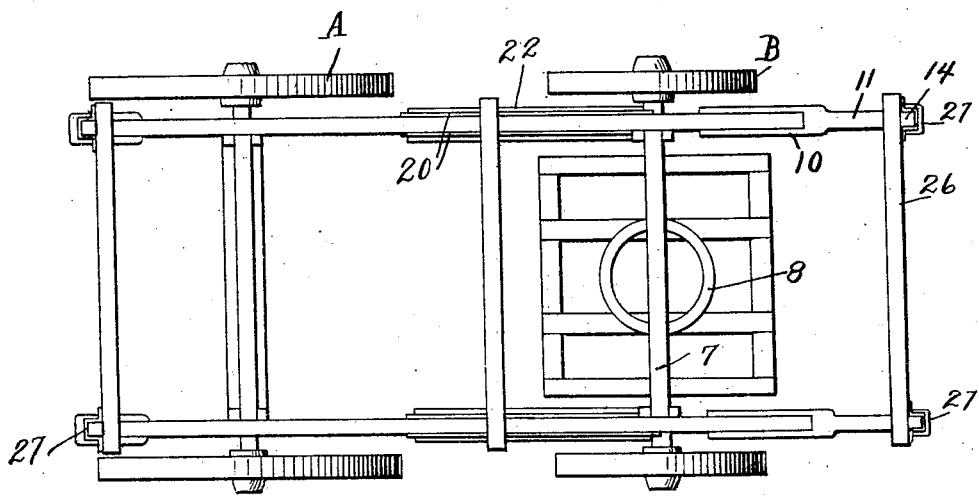
Fig. 2 is a plan view disclosing the substructure, the floor of the rack being removed.

Referring to the drawing, wherein is illustrated the preferred form of my invention, and in which like numerals of reference indicate corresponding parts throughout the several views, the rear wagon truck A and the front wagon truck B are of the usual construction, the rear truck being provided with the usual bolster 1 upon which the large rear wheels 2 are mounted. The front truck B is provided with the usual front bolster 3 for receiving the relatively small front wheels 4.

The rack comprises the side frame members 5 spaced apart to the desired width by the cross pieces 6 and 7. The cross piece 6 rests upon the bolster 1 while the front cross piece 7 rests upon the uppermost ring 8. A pair of rings 8 are interposed between the front cross piece 7 and the front bolster 3 for permitting the front bolster to be rotated in the usual manner for turning the front wheels. The forward end of each of the side members 5 is cut diagonally as at 9 and this end of each side member extends beyond the forward end of the truck or bolster 3. Connected to and embracing the forward end of each member 5 is one of the forward brace members 10 clearly shown by Fig. 5 of the drawing. This brace member includes the extension 11 having its free end provided with an enlarged portion or head 12 through which a square opening 13 is formed for receiving one end of one of the front standards 14. At the opposite end of the extension 11 is formed an angular yoke comprising the side portions 15 which are adapted to embrace the end of each side 5 of the rack.

A lip 16 is formed at the lower terminal of each portion 15 and these lips contact with the lower edge of each side 5 as clearly shown by Fig. 4 of the drawing. Rivets or bolts 17 are extended through openings 18 in each of the side portions 15 of the yoke and are also extended through the sides 5 of the rack for securely holding the angular yoke member in position.

Figure 3:
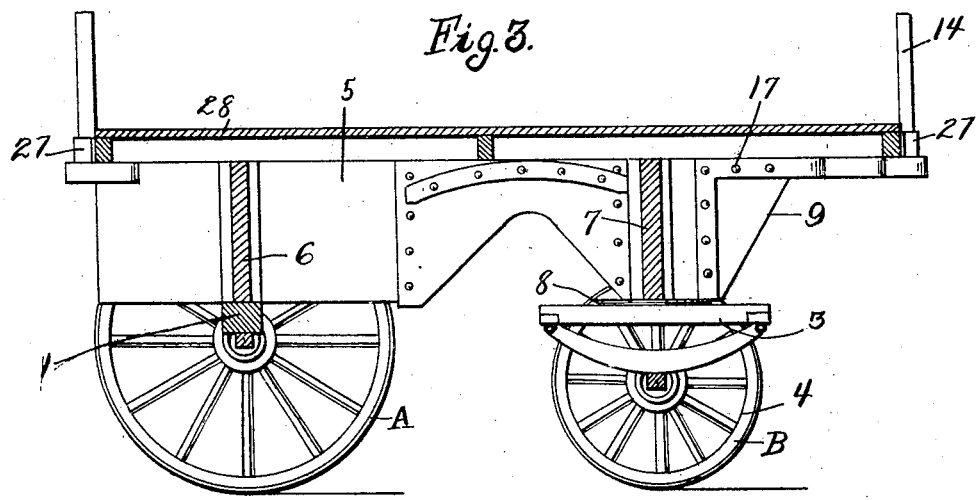
Fig. 3 is a vertical longitudinal section.

Intermediate the ends of each side 5, a V-shaped cut-out portion 19 is provided and the wheels of the front truck are permitted to pass through the said cut-out portion when the truck is turned for permitting the rack to be swung in relatively close quarters. Since each side 5 of the rack will, by virtue of this cut-out portion, be weakened, I have provided the strengthening plates 20, one pair of the said plates being employed upon each side 5. The plates 20 are provided with the cut-out portions to conform to the cut-out portion 19 and are riveted to the sides by the rivets 21. An arcuate reinforcing strip 22 is arranged upon each plate as clearly shown by Figs. 1 and 3 of the drawing and the rivets 23 are extended entirely through the plates 20 and the corresponding side 5.

Figure 6:
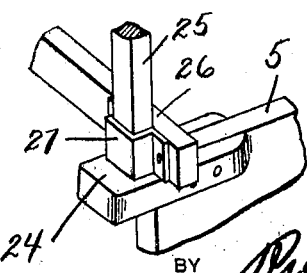
Fig. 6 is a detail perspective view of one of the rear brace members.

As shown in detail in Fig. 6, each side 5 has its rear end provided with supporting braces 24 adapted to receive the end of a rear standard 25. The standard 14 at the front of the rack and the standard 25 at the rear thereof are adapted to laterally support hay or grain when it is piled upon the rack and thus prevent accidental displacement.

Mounted upon the top edges of the sides 5 are the cross beams 26, one beam being arranged at each end while one is disposed in the center of the rack. The two end beams 26 are provided with clips 27 which are adapted to embrace the end standards 14 and 25. A floor 28 is mounted upon the cross beams 26 and this flooring is adapted to receive the hay or grain whereby it may be transported from place to place.

From the foregoing it will be observed that a very simple and durable wagon rack has been provided, the details of which embody the preferred form. I desire it to be understood however, that slight changes in the minor details of construction may be made without departing from the spirit of the invention or the scope of the claims hereunto appended.

I claim:

1. In a wagon rack, the combination with the trucks, front and rear bolsters mounted upon the front and rear trucks respectively, side frame members attached to the said rear bolster, the side frame members being provided with a cross piece having its ends joined to the said side frame members, a pair of contacting rings mounted upon the said front bolster, a front cross piece having connection with the side frame members near the front end of the latter the said front cross piece being mounted upon the uppermost ring, forward brace members secured to the ends of each of the said side frame members and provided with heads having apertures formed therein, a vertical standard fastened in each of the openings, yokes embracing the ends of the said frame members, and attached to the said brace members, lips formed at the terminals of the said yokes and contacting with the lower edges of each side frame member at the forward ends thereof.

2. In a wagon rack, the combination with the trucks of a wagon, the front trucks being adapted to turn for guiding the rack, side frame members, cross pieces fastened to the side frame members and mounted upon the said trucks, forward brace members fastened to the forward ends of each of the said side frame members, each brace member being provided with a head having an aperture formed therein, a vertical standard fastened in each of the said openings, each brace member including an angular yoke embracing the end of the corresponding side frame member, the said yoke being rigidly secured to the side frame member, and lips formed at the terminals of each angular yoke member and contacting with the lower edge of each side frame member.

3. In a wagon rack, the combination with the trucks of a wagon, each truck having a bolster mounted between the wheels, side frame members mounted upon the bolsters, cross pieces fastened to the side frame members and mounted lengthwise upon the bolsters, the said front truck being pivotally engaged with one of the cross pieces, cross beams mounted upon the said side frame members, a flooring carried by the said cross beams, the rear end of each side frame member being provided with a supporting brace, clips mounted upon the terminals of the rearmost cross beam and resting upon the said rear supporting braces, and standards carried by the said clips.

4. In a wagon rack, the combination with the trucks of a wagon, each truck having a bolster mounted between the wheels, side frame members mounted upon the bolsters, cross pieces fastened to the side frame members and mounted lengthwise upon the bolsters, the said front truck being pivotally engaged with one of the cross pieces, cross beams mounted upon the said side frame members, a flooring carried by the said cross beams, the rear end of each side frame member being provided with a supporting brace, clips mounted upon the terminals of the rearmost cross beams and resting upon the said rear supporting braces, standards carried by the said clips, a forward brace-member carried by the forward ends of the said side frame members, the said cross beam at the forward end of the said rack being also provided with vertical standards and resting upon the said forward supporting braces.

In testimony whereof I affix my signature in presence of two witnesses.

WILLIAM UPTHEGROVE.

Witnesses:
S. W. LARGE,
CARLOS A. READING.

Copies of this patent may be obtained for five cents each, by addressing the "Commissioner of Patents, Washington, D. C."